US006675557B2

United States Patent
Sperry et al.

(10) Patent No.: US 6,675,557 B2
(45) Date of Patent: Jan. 13, 2004

(54) APPARATUS FOR DISPENSING FLUID INTO PRE-FORMED, FLEXIBLE CONTAINERS AND ENCLOSING THE FLUID WITHIN THE CONTAINERS

(75) Inventors: Charles R. Sperry, Northampton, MA (US); Suzanne Scott, Springfield, VT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 181 days.

(21) Appl. No.: 09/759,578

(22) Filed: Jan. 12, 2001

(65) Prior Publication Data
US 2002/0092272 A1 Jul. 18, 2002

(51) Int. Cl.[7] ................................ B65B 5/00
(52) U.S. Cl. .................. 53/237; 53/455; 53/562; 53/472
(58) Field of Search ............ 53/455, 469, 472, 53/237, 562, 371.4, 374.4

(56) References Cited

U.S. PATENT DOCUMENTS

| 3,359,703 | A | | 12/1967 | Quaadgras | |
|---|---|---|---|---|---|
| 3,687,370 | A | | 8/1972 | Sperry | 239/112 |
| 3,751,875 | A | | 8/1973 | Membrino | 53/180 |
| 3,938,298 | A | | 2/1976 | Luhman et al. | 53/7 |
| 3,945,569 | A | | 3/1976 | Sperry | 239/112 |
| 3,986,918 | A | * | 10/1976 | Berner | |
| 4,169,002 | A | | 9/1979 | Larson | 156/145 |
| 4,426,023 | A | | 1/1984 | Sperry et al. | 222/132 |
| 4,665,552 | A | | 5/1987 | Lems et al. | 383/37 |
| 4,674,268 | A | | 6/1987 | Gavronsky et al. | 53/468 |
| 4,800,708 | A | | 1/1989 | Sperry | 53/449 |
| 4,854,109 | A | | 8/1989 | Pinarer et al. | 53/397 |
| 4,893,453 | A | * | 1/1990 | Weikert | 53/469 |
| 4,898,327 | A | | 2/1990 | Sperry et al. | 239/1 |
| 4,904,092 | A | * | 2/1990 | Campbell et al. | |
| 4,999,975 | A | * | 3/1991 | Willden et al. | 53/472 |
| 5,027,583 | A | | 7/1991 | Chelak | 53/451 |
| 5,187,917 | A | | 2/1993 | Mykleby | 53/434 |
| 5,255,847 | A | | 10/1993 | Sperry et al. | 239/112 |
| 5,335,483 | A | * | 8/1994 | Gavronsky et al. | 53/455 |
| 5,376,219 | A | | 12/1994 | Sperry et al. | 156/515 |
| 5,727,370 | A | | 3/1998 | Sperry | 53/472 |
| 5,776,510 | A | | 7/1998 | Reichental et al. | 425/112 |
| 5,873,215 | A | | 2/1999 | Aquarius et al. | 53/403 |
| 5,942,076 | A | | 8/1999 | Salerno et al. | 156/359 |
| 5,996,319 | A | | 12/1999 | Lerner et al. | 53/481 |
| 6,003,288 | A | | 12/1999 | Sperry et al. | 53/552 |
| RE36,759 | E | * | 7/2000 | Hoover et al. | 53/472 |
| 6,234,777 | B1 | | 5/2001 | Speery et al. | 425/46 |
| 6,582,800 | B2 | | 6/2003 | Fuss et al. | |

FOREIGN PATENT DOCUMENTS

| DE | 199 13 408 A1 | 10/2000 |
|---|---|---|
| EP | 0 395 438 | 4/1990 |
| EP | 1 022 234 A1 | 7/2000 |
| WO | WO 00/53501 | 3/2000 |

* cited by examiner

Primary Examiner—Eugene Kim
Assistant Examiner—Sameh Tawfik
(74) Attorney, Agent, or Firm—Thomas C. Lagaly

(57) ABSTRACT

An apparatus for dispensing fluid into pre-formed, flexible containers and enclosing the fluid within the containers includes a web of film comprising a series of pre-formed flexible containers, each of the pre-formed containers being capable of holding therein a quantity of fluid and having an opening for receiving such fluid. After fluid is placed in each pre-formed container, the opening is sealed closed to thereby enclose the fluid within the container.

11 Claims, 2 Drawing Sheets

APPARATUS FOR DISPENSING FLUID INTO PRE-FORMED, FLEXIBLE CONTAINERS AND ENCLOSING THE FLUID WITHIN THE CONTAINERS

BACKGROUND OF THE INVENTION

The present invention relates to foam-in-place packaging and, more particularly, to a simplified and improved apparatus and process for producing foam-in-place packaging cushions and other flexible, fluid-filled containers.

Foam-in-place packaging is a highly useful technique for on-demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated apparatus produces flexible bags or other containers from flexible, plastic film and dispenses a foamable composition into the bags as the bags are being formed. As the composition expands into a foam within the bag, the bag is sealed shut and typically dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present invention, and are illustrated, for example, in U.S. Pat. Nos. 4,800,708, 4,854,109, 5,027,583, 5,376,219, and 6,003,288, the contents of each of which are incorporated entirely herein by reference.

As will be noted from the foregoing patents, conventional packaging apparatus for forming a foam-in-place cushions begin with a plastic film and convert the film into bags (for containment of the foamable composition) through the use of various heat-seal devices. That is, two plies of plastic film material are generally heat-sealed together both transversely and longitudinally as they are being fed from a stock supply to form a generally rectangular bag with the foam inside. In alternative embodiments, the stock supply of plastic film material can be fed in center-folded fashion so that one side of the bag is a fold, rather than a heat seal. Nevertheless, the other three sides of the bag must formed in-line by the packaging machine through the use of two or more heat-sealing devices.

Such conventional foam-in-place packaging apparatus have gained rapid and wide acceptance in the marketplace and have served their purposes well. However, improvement of such apparatus is continually sought. One aspect in which improvement is desired concerns the complexity of such apparatus, particularly with regard to the various heat seals that must be formed in order to convert the stock film into bags for containment of the foamable composition. Generally, one or two heat seal devices are needed to form longitudinal heat seals while a different type of heat seal device is needed to form transverse heat seals. In addition, as each bag is filled and sealed, the resultant completed foam-in-place cushion must be severed from the film. This is typically done with the application of sufficient heat to melt completely through the plastic.

Accordingly, there is a need in the art for a simpler and less expensive foam-in-place packaging apparatus that does not require two or more different types of heat-seal devices and a severing device. Such apparatus would require far less maintenance than conventional foam-in-place packaging apparatus and would be affordable to smaller companies. A simple but effective means for automating foam-in-place packaging apparatus is also needed.

SUMMARY OF THE INVENTION

Those needs are met by the present invention, which, in one aspect, provides an apparatus for dispensing fluid into pre-formed, flexible containers and enclosing the fluid within the containers, comprising:

a. a web of film comprising a series of pre-formed flexible containers, each of the pre-formed containers being capable of holding therein a quantity of fluid and having an opening for receiving such fluid;

b. a mechanism that conveys the film web along a path of travel;

c. a dispenser through which fluid may flow in predetermined amounts, the dispenser being positioned adjacent the travel path of the film web such that the dispenser is capable of dispensing fluid into the pre-formed containers via the openings therein; and d. a device for sealing closed the opening in each of the pre-formed containers to thereby enclose fluid held within the containers.

The use of pre-formed containers greatly simplifies and reduces the cost of the above-described apparatus, in that only the opening of the container needs to be sealed closed by the apparatus.

Preferably, each of the pre-formed containers are manually detachable from the film web along one or more lines of weakness.

Another aspect of the invention is a method for dispensing fluid into pre-formed, flexible containers and enclosing the fluid within the containers, comprising:

a. supplying a web of film comprising a series of pre-formed flexible containers, each of the pre-formed containers being capable of holding therein a quantity of fluid and having an opening for receiving such fluid;

b. conveying the film web along a predetermined path of travel;

c. dispensing fluid into the pre-formed containers via the openings therein; and d. sealing closed the opening in each of the pre-formed containers to thereby enclose fluid held within the containers.

A further aspect of the invention is an automated apparatus for dispensing fluid into flexible containers and enclosing the fluid within the containers, comprising:

a. a web of film comprising two juxtaposed plies of plastic film that define a partially-formed flexible container, the film web also comprising one or more indicators thereon;

b. a mechanism that conveys the film web along a path of travel;

c. a dispenser through which fluid may flow in predetermined amounts, the dispenser being positioned adjacent the travel path of the film web such that the dispenser can dispense fluid product into the partially-formed flexible container;

d. a sensing device capable of detecting the one or more indicators on the film web and generating an output signal upon detection of the one or more indicators;

e. a control device capable of receiving the output signal from the sensing device as an input signal and, based at least in part on the input signal, controlling the conveyance of the film web and dispensation of fluid into the pre-formed containers; and f. one or more devices for sealing the plies of plastic film together to complete the partially-formed container, thereby enclosing the fluid product therein.

These and other aspects and features of the invention may be better understood with reference to the following description and accompanying drawings.

DETAILED DESCRIPTION OF THE INVENTION

Figure 1:
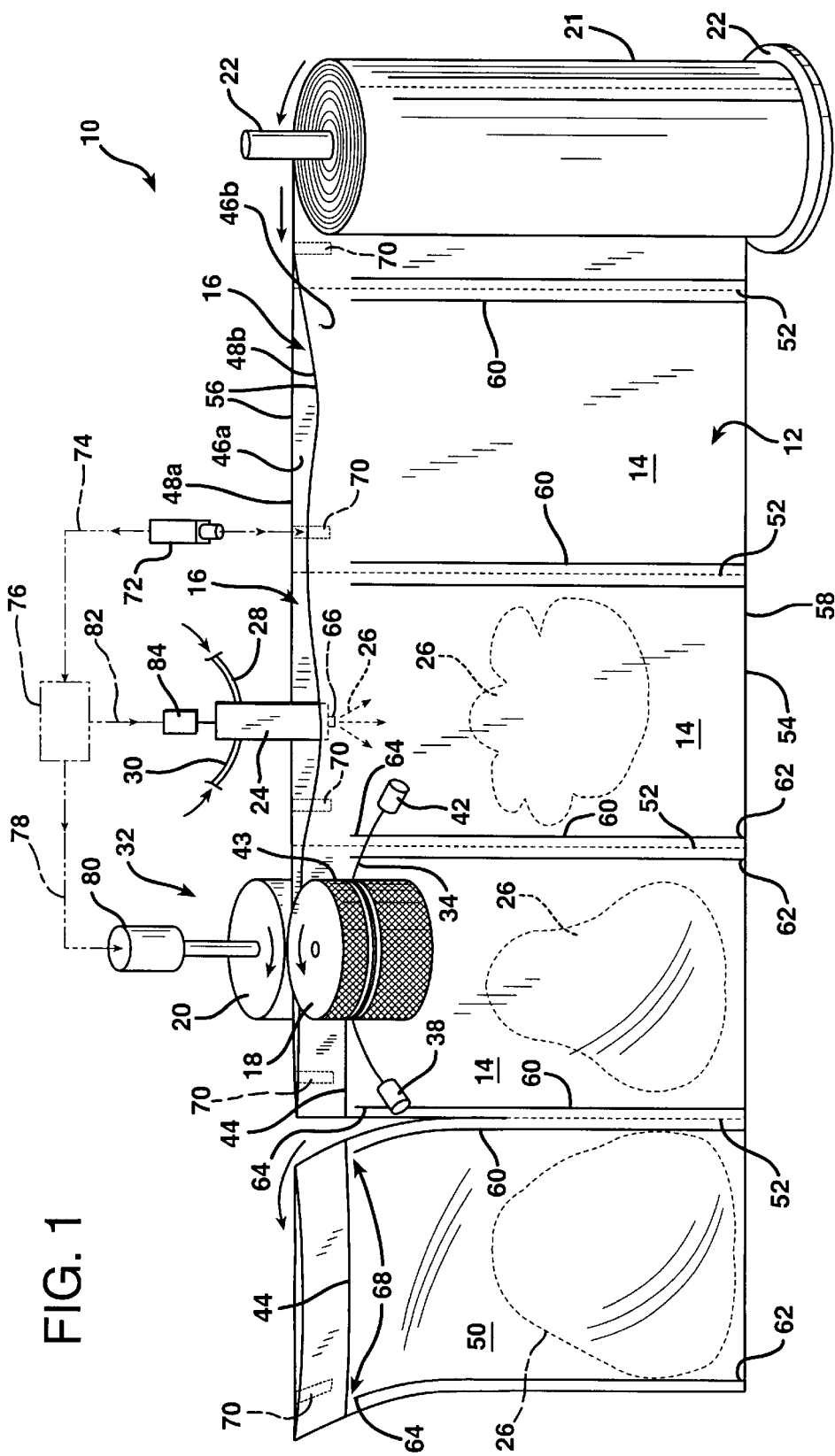
FIG. 1 is a schematic view of an apparatus in accordance with the present invention in which pre-formed flexible containers incorporated in a folded film web are injected with a fluid and then sealed closed.

FIG. 1 schematically illustrates an apparatus 10 in accordance with the present invention for dispensing fluid into pre-formed, flexible containers and enclosing the fluid within the containers. The apparatus includes a web of film 12 comprising a series of pre-formed flexible containers 14. Each of such pre-formed containers 14 is capable of holding therein a quantity of fluid and also has an opening 16 for receiving such fluid. Film web 12 may, in general, comprise any flexible material that can be manipulated by apparatus 10 as herein described, including various thermoplastic or fibrous materials, e.g., polyethylene homopolymer or copolymer, polypropylene homopolymer or copolymer, paper, etc.

Apparatus 10 further includes a mechanism that conveys the film web 12 along a predetermined path of travel. Such conveying mechanism may include a pair of counter-rotating cylinders 18 and 20 that pull the film web 12 through apparatus 10 along a predetermined travel path. Film web 12 is preferably provided in the form of a supply roll 21, which may be mounted on supply hub 22 or similar device to position and support the supply roll 21 as the film web 12 advanced from such supply roll by counter-rotating cylinders 18, 20. Thus, supply roll 21 and supply hub 22 are further components of the conveying mechanism. The "path of travel" (or "travel path") of film web 12 simply refers to the route that the film web traverses while being conveyed through the apparatus 10, as indicated by the shape assumed by the film web due to the manipulation thereof by the above-described conveying mechanism of apparatus 10. As will be appreciated, the particular conveying mechanism components and travel path selected is not critical to the practice of the present invention, and various other conveying mechanism components and travel-path configurations may be employed as desired, including additional cylinders or rollers such as guide rollers, e.g., to provide a more elaborate travel path in order to reduce the 'footprint' of the apparatus.

Apparatus 10 further includes a dispenser 24 through which a fluid 26 may flow in predetermined amounts, the dispenser being in fluid communication with at least one fluid source (not shown) containing therein fluid 26. Dispenser 24 is positioned adjacent to or in the travel path of film web 12 such that the dispenser is can dispense fluid 26 into the pre-formed containers 14 via the openings 16 therein. Any desired fluid may be dispensed into the containers in accordance with the present invention, including gaseous fluids such as air in order to make inflated air cushions for packaging and other applications; pumpable foods such as soups, sauces, and condiments; flowable foods such as shredded cheese; industrial liquids such as detergents, chemical solutions, etc.; medical fluids such as saline or pharmaceutical solutions; and foamable compositions for foam-in-place packaging.

The apparatus 10 as presently illustrated is particularly well suited for the latter application, i.e., for making foam-in-place cushions. Thus, fluid 26 is preferably selected from polyols, isocyanates, and mixtures of polyols and isocyanates. For example, one or more polyols may be supplied from a fluid source (not shown) to dispenser 24 via supply line 28, while one or more isocyanates may be supplied from a second fluid source (not shown) to dispenser 24 via supply line 30. Suitable fluid sources for the polyol(s) and isocyanate(s) may include a separate drum or other container for each chemical. The polyol(s) and isocyanate(s) may flow through respective supply lines 28, 30 by action of separate pumps (not shown) that are in fluid communication with both the fluid source and supply lines 28, 30. Alternatively, the fluid sources may be positioned above dispenser 24 so that the polyol(s) and isocyanate(s) flow through the supply lines 28, 30 by force of gravity.

Dispenser 24 receives and mixes the polyol(s) and isocyanate(s) and dispenses the resultant mixture of fluids, indicated at 26, into the pre-formed containers 14. As explained in the background section hereinabove, the polyol(s) and isocyanate(s) are foam precursors which, when mixed, produce a foamable composition that reacts to form a polyurethane foam. A foamable composition that will produce polyurethane foam is thus injected into each container 14, thereby producing a foam-in-place packaging cushion. The amount of such foamable fluid to be dispensed into each container 14 by dispenser 24 is predetermined, based on, e.g., the internal volume within the container, the degree to which the fluid expands as it forms into a foam, the amount of foam that is desired to be contained in each completed container/packaging cushion, etc. Such determination of the predetermined amount of fluid to be dispensed by dispenser 24 is readily and commonly made by those having ordinary skill in the art to which this invention pertains, and requires no undue experimentation.

Suitable dispensers of the type illustrated at 24 are well known and are disclosed, e.g., in commonly-assigned U.S. Pat. Nos. 4,898,327 and 5,255,847, and in a copending patent application entitled FLUID DISPENSER HAVING IMPROVED CLEANING SOLVENT DELIVERY SYSTEM (Sperry et al.), bearing Ser. No. 09/760,189 and filed on the same day as the present application; the disclosures of each of the foregoing are hereby incorporated herein by reference. Other suitable dispensers, albeit in the form of a hand-held mixing gun, are disclosed in commonly-assigned U.S. Pat. Nos. 3,687,370, 3,945,569, and 4,426,023, the disclosures of which are also hereby incorporated herein by reference.

As an alternative to a dispenser as described above that mixes the polyol(s) and isocyanate(s) before dispensing the resultant mixture into the container, a dispenser of the type disclosed in commonly-owned U.S. Pat. No. 5,727,370 may be used. The disclosure of U.S. Pat. No. 5,727,370 is hereby incorporated herein by reference. Such a dispenser as disclosed in the '370 patent injects the polyol(s) and isocyanate (s) into the container through separate discharge nozzles such that the two foam precursors do not begin to mix and form foam until after being introduced into the container.

A further component of apparatus 10 is a device 32 for sealing closed the opening 16 in each of the pre-formed containers 14, thereby enclosing fluid 26 held within such containers. A preferred sealing device is disclosed in a copending patent application entitled DEVICE FOR SEALING TWO PLIES OF FILM TOGETHER, PARTICULARLY FOR ENCLOSING A FOAMABLE COMPOSITION IN A FLEXIBLE CONTAINER (Sperry et al.), bearing Ser. No. 09/760,105 and filed on the same day as the present application, the disclosure of which is hereby incorporated herein by reference. Such a sealing device is illustrated in FIG. 1 at 32, and includes an electrically conductive heating element 34 having a first end secured to a first node 38 and a second end secured to a second node 42. Sealing device 32 also includes a rotatable support cylinder, which may be provided by cylinder 18 as shown (i.e., cylinder 18 may function both as a component of the conveying mechanism and as a component of the sealing device). Cylinder 18 has an outer, circumferential surface 43 that is positioned in abutting relationship with heating element 34 and capable of rotating against the heating element along a predetermined contact arc (hidden from view in FIG. 1 but located in the travel path of film web 12 in between cylinders 18 and 20) such that less than a complete circumference of outer surface 43 of cylinder 18 is in contact with heating element 34.

The openings 16 in each of the pre-formed containers 14 are sealed closed when the conveying mechanism brings film web 12 into moving contact with heating element 34 along the contact arc and sufficient current is caused to flow through the heating element that it (i.e., the heating element) heats to a sealing temperature sufficient to form longitudinal heat-seal 44 between juxtaposed film plies 46a and 46b of film web 12. Longitudinal heat-seal 44, in turn, seals closed each of the openings 16 of the pre-formed containers 14 after fluid 26 has been injected into such containers by dispenser 24, thereby forming a completed container 50. When film web 12 is formed from a thermoplastic film, the sealing temperature necessary to form longitudinal heat-seal 44 is that which causes the film plies 46a, b to weld or fuse together by becoming temporarily fully or partially molten in the area of contact with the heating element 34. Such temperature, i.e., the "sealing temperature," may readily be determined by those of ordinary skill in the art without undue experimentation for a given application based on, e.g., the composition and thickness of the film plies to be sealed, the speed at which the film plies move against the heating element, and the pressure at which the film plies and heating element are urged together by cylinders 18 and 20 at the contact arc. As an example, when the sealing device 32 is used to manufacture foam-in-place, polyurethane foam cushions using polyethylene-based film ranging in thickness from about 0.5 to about 2 mils, the sealing temperature to which heating element 34 is heated may range from about 300 to about 500° F.

Heating element 34 may be any device capable of heating to a predetermined temperature sufficient to heat-seal film plies 46a, b together. Suitable types of devices for heating element 34 include one or more wires comprising metal and/or other electrically conductive materials; one or more ribbons comprising metal; circuit-printed plastic ribbons, e.g., metal printed on a plastic substrate comprising polyethylene terephthalate (PET); and other suitable electrically conductive devices.

The drawings illustrate heating element 34 in the form of a wire. When heating element 34 assumes such a form, the wire may have any desired cross-sectional shape, including round, square, oval, rectangular, etc.

An alternative sealing device which may be used in the apparatus 10 in accordance with the present invention employs a heating element that is completely wrapped about the outer circumference of a cylinder, as disclosed in the above-incorporated U.S. Pat. No. 5,376,219. As a further alternative to employing a sealing device 32 as described above, one or both of film plies 46a, b may include strips of a bonding material located at or adjacent to longitudinal side edges 48a and/or 48b of film web 12. Such a bonding material, e.g., an adhesive or cohesive material, forms a longitudinal seal similar to seal 44 when the film plies 46a, b are pressed together between cylinders 18, 20. Further details concerning this means for sealing two film plies together are described in copending U.S. Ser. No. 09/591, 830, filed Jun. 12, 2000 and entitled METHOD FOR ENCLOSING A FOAMABLE COMPOSITION IN A FLEXIBLE BAG (Oberle et al.), the disclosure of which is hereby incorporated herein by reference.

Pre-formed containers 14 are preferably manually detachable from film web 12 along one or more lines of weakness 52, e.g., a series of perforations, each of which extends from one edge 54 of film web 12 to an opposing edge 56 thereof as shown (edges 54 and 56 are discussed more fully below). In this manner, completed containers 50 may be manually separated from the film web by tearing through the line of weakness 52 that bonds the completed container to the rest of the film web as shown in FIG. 1. This eliminates the need for an automated severing device, which would otherwise add cost and complexity to apparatus 10. When apparatus 10 is used to make foam-in-place packaging cushions, i.e., wherein fluid 26 is a foamable composition, each completed container 50, containing therein an expanding foam, may be manually detached from the film web 12 and then placed against a product to be packaged and further placed in a box or other shipping vessel to form an individualized packaging cushion for such product. Alternatively, completed container 50 may be placed in a mold to produce a packaging cushion having a predefined shape as disclosed, e.g., in commonly assigned U.S. Pat. No. 5,776,510.

Film web 12 will now be described in greater detail. Such film web preferably comprises a flexible, thermoplastic film, and may be formed from any polymeric material capable of being formed into a flexible container as described herein. Non-limiting examples of suitable polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

Film web 12 preferably comprises a film having a pair of longitudinal side edges 48a and 48b and a longitudinal fold 58 to form a longitudinally-folded film web having two juxtaposed film plies 46a, b with side edges 48a, b being positioned adjacent to one another as shown. That is, before being folded, film web 12 was a single-ply, flat film in which longitudinal side edges 48a, b were opposite one another. The film is folded longitudinally (i.e., length-wise) such that side edges 48a, b are brought together or at least closer together such that they are adjacent to one another. That is, the film may be 'center-folded' as shown such that each of film plies 46a, b have substantially the same dimensions and the longitudinal side edges 48a, b are substantially aligned and thus have the same distance from longitudinal fold 58, i.e., the longitudinal fold 58 is located approximately in the center of the width of the film. Alternatively, side edges 48a, b may be off-set if desired, i.e., the longitudinal fold 58 is not located in the center of the width of the film but is, instead, off-center. This may be desired, e.g., to facilitate the insertion of the discharge nozzle of the dispenser 24 into the film web 12. As used herein with reference to film web 12, the term "longitudinal" refers to the direction of conveyance of film web 12, i.e., the direction in which film web 12 is advanced from supply roll 21 and conveyed through apparatus 10 as indicated in FIG. 1; "longitudinal" also corresponds to the direction of the length dimension (longest dimension) of film web 12.

The folded film web 12 thus includes a closed longitudinal edge 54, which is formed by the longitudinal fold 58 as discussed immediately above, and an open longitudinal edge 56, which is positioned opposite and substantially parallel to the closed longitudinal edge 54. Open longitudinal edge 56 is formed from the adjacently-positioned longitudinal side edges 48a, b. A series of transverse heat seals 60 are also included in the folded film web 12. Such heat seals extend from the closed longitudinal edge 54 and bond juxtaposed film plies 46a, b together such that folded film web 12 is segregated into the series of pre-formed flexible containers 14, with the open longitudinal edge 56 providing openings 16 into such containers for receiving fluid 26. Transverse heat seals 60 are preferably, but do not have to be, perpendicular to closed longitudinal edge 54 as shown. If desired, the transverse heat seals 60 can extend from closed edge 54 at any desired angle.

An advantage of the invention is that all of the aforedescribed features, i.e., longitudinal fold 58, transverse heat seals 60, and lines of weakness 52, are incorporated into film web 12 prior to employing the film web in apparatus 10. In this manner, the containers 14 are "pre-formed" as such features do not have to be provided by apparatus 10, thereby greatly simplifying and reducing the cost of apparatus 10 as compared with traditional foam-in-place packaging machines.

As shown in FIG. 1, the transverse heat seals 60 may each have a first end 62 located at closed longitudinal edge 54 and a second end 64 terminating a predetermined distance from open longitudinal edge 56. Further, dispenser 24 has a discharge nozzle 66 through which fluid 26 exits the dispenser. In this manner, the discharge nozzle 66 of the dispenser may be positioned within folded film web 12 between open longitudinal edge 56 and the second end 64 of transverse heat seals 60. This allows the dispenser 24 to dispense fluid 26 into pre-formed containers 14 without physical interference between the discharge nozzle 66 and the transverse heat seals 60. Further, by being positioned within the folded film web 12, discharge nozzle 66 of dispenser 24 keeps the juxtaposed film plies 46a, b separated at the open longitudinal edge 56, thereby facilitating the transfer of fluid 26 from dispenser 24 and into pre-formed containers 14 via openings 16 in such containers.

If desired, each completed container 50 may be provided with a vent 68. This may be beneficial when fluid 26 is a foamable composition that produces excess gas while expanding into a foam inside of the completed container 50. For example, excess carbon dioxide and water vapor are generally produced during the reaction of the foam precursors (polyol, isocyanate, and water) that lead to the formation of polyurethane foam. Vent 68 may be provided by adapting sealing device 32 to position longitudinal heat seal 44 between open longitudinal edge 56 and the second ends 64 of transverse heat seals 60 such that the longitudinal heat seal 44, which closes the opening 16 in containers 14, is spaced from the second ends 64 as shown. The resultant gap between the second ends 64 of transverse heat seals 60 and longitudinal heat seal 44 provides vents 68, which allow excess gas generated by the foaming reaction to escape from the completed container 50. At the same time, since the vents 68 are located in the upper corners of the completed container 50, escape of the expanding foam from the container is unlikely. Thus, although the closure of openings 16 in this manner only partially encloses the fluid 26 held within the pre-formed containers 14 to make completed containers 50, this is acceptable for making foam-in-place, polyurethane packaging cushions.

In other applications, it may desirable to fully enclose fluid that is held within the containers, e.g., when fluid 26 is a liquid that does not produce gas or the fluid is a gas such as air that is intended to remain trapped inside the completed container 50 (i.e., to make an air cushion). For such applications, sealing device 32 may be adapted to position longitudinal heat seal 44 in such a manner that it intersects each of the transverse heat seals 60 so that no gap is present between the second ends 64 of transverse heat seals 60 and longitudinal heat seal 44 (see, e.g., FIG. 2).

As noted above, pre-formed containers 14 are preferably manually detachable from folded film web 12 along one or more lines of weakness 52. Such lines of weakness 52 are preferably transverse lines of weakness that extend from closed longitudinal edge 54 to open longitudinal edge 56, and are positioned between transverse heat seals 60 from adjacent pre-formed containers 14 as shown. In this manner, each pre-formed container is fully detachable from the film web 12 such that each completed container 50 may be removed from the web as shown without disturbing the dispensing and sealing operations occurring on 'upstream' portions of the film web 12.

As shown in FIG. 1, folded film web 12 is preferably conveyed in a substantially horizontal direction while pre-formed containers 14 are oriented in a substantially vertical configuration, with open longitudinal edge 56 forming an uppermost edge of each pre-formed container 14 and closed longitudinal edge 54 forming a lowermost edge of each pre-formed container 14. Further, dispenser 24 is preferably positioned to dispense fluid 26 into each pre-formed container 14 in a substantially vertical, downward direction. Such an arrangement is a beneficial feature of the invention in that, since the lowermost edge of each container is formed from the longitudinal fold 58 in the film web, it is highly unlikely that any fluid 26 will leak from such lowermost edge, which can otherwise occur when the lowermost edge of flexible containers are formed by a heat-seal device on the packaging apparatus, as is commonly done with conventional foam-in-place packaging machines. Additionally, this arrangement allows for a more uniform distribution of fluid 26 in each pre-formed container 14 by continuously dispensing fluid 26 from dispenser 24 while the container 14 being filled with such fluid moves horizontally along the fixed discharge nozzle 66 of the dispenser. As a result of such moving distribution of fluid 26 into the container 14, the fluid 26 may be uniformly distributed across the width of the container.

Figure 2:
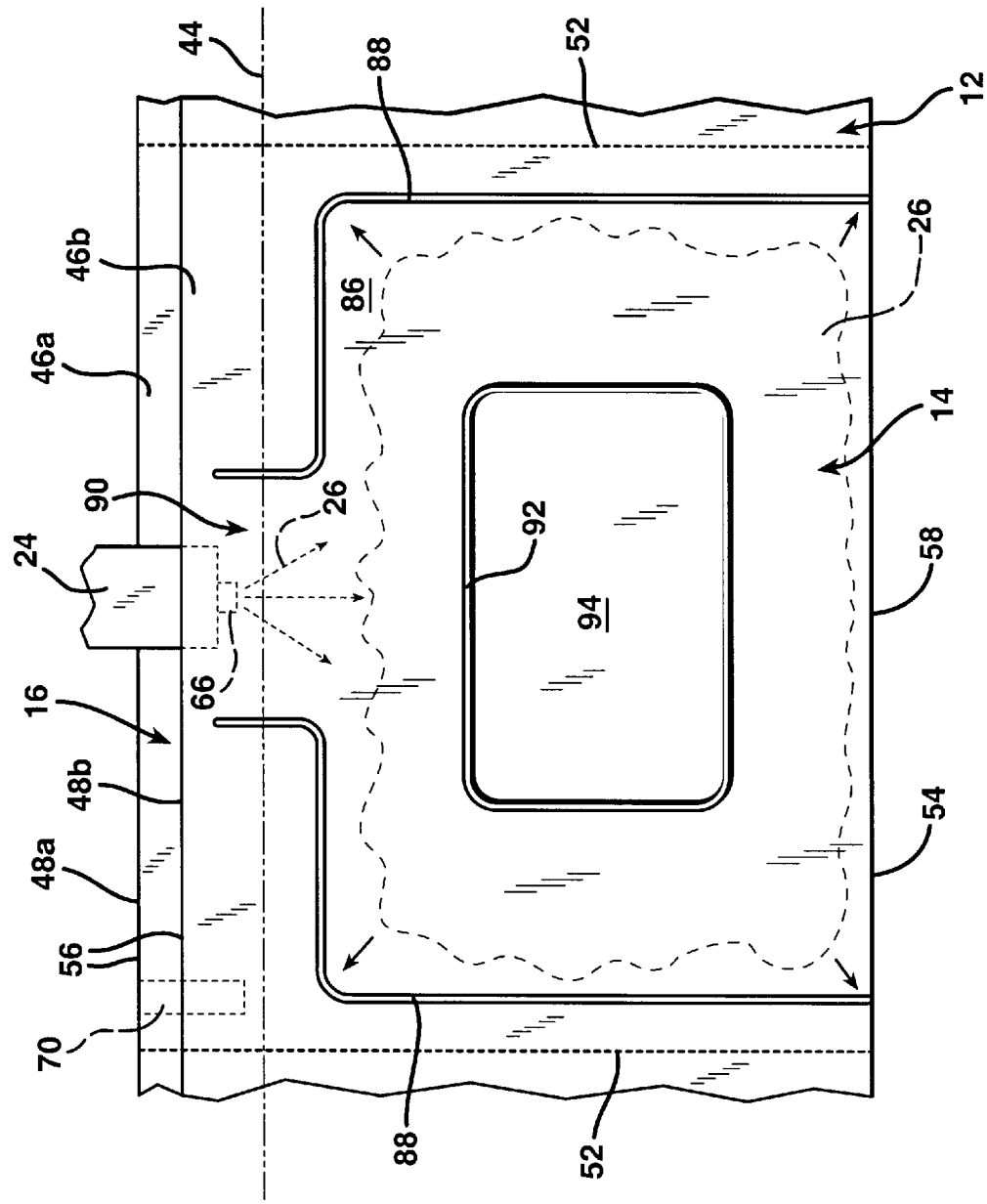
FIG. 2 is a partial view of a film web as shown in FIG. 1, showing an alternative partially-formed container having an individual channel therein in which the fluid may be held.

FIG. 2 illustrates an optional feature of the invention wherein each of the pre-formed containers 14 may include one or more individual channels 86 in which fluid 26 may be held. Channel 86 may be formed by employing a pair of outer heat seals 88 that extend from closed longitudinal edge 54 and converge together towards open longitudinal edge 56 to form a narrow opening 90 into channel 86. Opening 90 is more narrow than the wider opening 16 into the pre-formed container 14, which extends along the entire length of the container 14 between opposing lines of weakness 52. Channel 86 is further formed by inner heat seal 92, which prevents fluid 26 from entering the center portion 94 of the pre-formed container 14. After a desired amount of fluid 26 has been dispensed into channel 86, the opening 16, but more specifically the narrow opening 90, is sealed closed by sealing device 32, i.e., by longitudinal heat seal 44, the location of which is shown in phantom in FIG. 2. The longitudinal heat seal 44 may intersect or be spaced from heat seals 88 as desired. As shown, the longitudinal heat seal 44 intersects the heat seals 88 and thus, fully encloses the fluid 26 within channel 86 without vents 68.

By employing one or more individual channels to hold the fluid as shown in FIG. 2, packaging cushions having a pre-defined general shape may be formed. This may useful where a number of similarly shaped objects are to be packaged.

FIG. 1 illustrates an additional aspect of the invention, which provides for automatic control of apparatus 10. Thus, film web 12 of apparatus 10 may further include one or more indicators 70. Apparatus 10 may also include a sensing device 72, which is capable of detecting indicators 70 on film web 12 and also generating an output signal 74 upon detection of such indicators 70. Further, a control device, schematically indicated at 76, may be included. Such control device 76 is capable of receiving output signal 74 from sensing device 72 as an input signal and, based at least in part on such signal 74, controlling the conveyance of film web 12 and dispensation of fluid 26 into pre-formed containers 14. To control of the conveyance of film web 12, control device 76 may send a signal 78 to actuator 80 which, in turn, drives the rotation of cylinder 20 and also cylinder 18 as a result of the abutting relationship between such cylinders. Actuator 80 causes cylinder 20 to rotate, and therefore film web 12 to advance, when directed to do so by control device 76. Similarly, control device 76 may control the dispensation of fluid 26 by dispenser 24 via signal 82 to actuator 84. Actuator 84 causes dispenser 24 to dispense and cease dispensing fluid 26 when directed to do so by control device 76.

Indicators 70 are preferably located on film web 12 such that they provide to control device 76 an indication as to the position of each of the pre-formed containers 14. This may be accomplished by placing each indicator 70 at the same location on each container 14 as shown. In this manner, control device 76 may cause the pre-formed containers 14 on film web 12 to move intermittently, via appropriate 'start-stop' signals 78 to actuator 80, in registration with the dispensation of fluid 26 into each container 14 by dispenser 24. That is, each pre-formed container 14 is sequentially brought into proper position under dispenser 24 to receive fluid 26, at which point the advancement of the film web temporarily stops until a predetermined amount of fluid 26 has been dispensed into a pre-formed container. Thereafter, the film web once again advances forward incrementally as the dispensation cycle is repeated on the next container 14. Alternatively, the container 14 having fluid 26 dispensed therein may continue to move horizontally as the fluid is dispensed therein in order to distribute the fluid across the width of the container.

Sensing device 72 is preferably an optical sensing device and indicators 70 preferably are optically-detectable. Optical sensing devices are well known in the art. Suitable optically-detectable indicators may include a printed or labeled mark disposed on the outside of film web 12 (or trap-printed within one or both film plies 46a, b), such as a printed stripe, block, or other design, or a bar-code that conveys information to control device 76 regarding, e.g., the length and height of each pre-formed container, the type of polymer(s) from which film web 12 is formed, the thickness of the film, etc., so that the controller can adjust the speed at which the film web moves through the apparatus, the amount of fluid dispensed by dispenser 24, the current sent through heating element 34, etc. Numerous other sensing device/indicator parings may be employed as desired including, e.g., infrared, ultraviolet, magnetic, physical, or sonic sensing devices/indicators.

Control device 76 may be any suitable controller capable of performing the functions specified herein, such as, e.g. a programmable logic controller (PLC), such devices being well known and commonly used in a variety of applications.

Actuator 80 is rotationally coupled to cylinder 20 so that, when power (e.g., electricity, or hydraulic or pneumatic fluid) is permitted by control device 76 to flow through the actuator, cylinder 20 rotates. Since the cylinder 20 is positioned in abutting relationship with cylinder 18 as shown, the rotation of cylinder 20 causes cylinder 18 to rotate. Alternatively, actuator 80 could be coupled instead to support cylinder 18 or, as a further alternative, separate actuators could be coupled to both cylinders, e.g., to maintain a high degree of tension in the film web between cylinders 18, 20 and supply roll 21.

When dispenser 24 is of the type as described hereinabove, actuator 84 is preferably translationally coupled to a central valving rod disposed within the dispenser. Depending on the signal 82 from control device 76, such valving rod translates within the dispenser between open and closed positions, which allow and prevent, respectively, fluid flow through the dispenser. Actuator 84 may be powered electrically, pneumatically, or otherwise.

The aforedescribed control scheme may be used in foam-in-place packaging apparatus employing film webs that do not have a series of pre-formed containers as hereindescribed but, rather, form containers in-line via longitudinal and transverse heat-seals, such heat-seals being formed between two juxtaposed film plies that define a partially-formed container. Typically, an individual container is continually formed at the same time that it is injected with fluid, with final closure occurring after a predetermined amount of fluid has been added. Such packaging apparatus and the juxtaposed film webs used therein are described more fully in the above-incorporated patents in the Background. Thus, where a web of film comprising two juxtaposed plies of plastic film that define a partially-formed flexible container is employed (i.e., not a film having a series of 'pre-formed' containers as described above), such film web may also comprise one or more indicators thereon as shown at 70. Such indicators are preferably spaced substantially evenly in series along the longitudinal length of one of the juxtaposed film webs to provide an indication of the length (amount) of the film web that is conveyed past a sensing device as at 72. This allows a control device such as device 76 to cause the conveying mechanism, via an actuator as at 80, to intermittently convey a predetermined length of the film web along a travel path to produce completed containers of substantially uniform dimensions.

Accordingly, a packaging method in accordance with present invention may proceed as follows. Film web 12, having a series of pre-formed flexible containers 14 formed therein, is supplied from supply roll 21. Film web 12 is conveyed along a predetermined path of travel as shown in FIG. 1, either in an indexed (intermittent) or continuous fashion as desired. When a pre-formed container 14 has been positioned adjacent to dispenser 24 such that the container can receive fluid 26 therein, the conveying mechanism (cylinders 18, 20 and actuator 80) may temporarily halt the advancement of the film web from supply roll 21. The dispenser 24 then dispenses fluid 26 into such pre-formed container 14 via opening 16 therein. Alternatively, the container 14 having fluid 26 dispensed therein may continue to move horizontally as the fluid is dispensed therein in order to distribute the fluid across the width of the container. When the dispensing process has been completed, the entire film web 12 moves in the direction of the arrow (i.e., to the left as illustrated in FIG. 1) so that the next container 14 to be filled may be brought under the dispenser 24. At the same time, the opening 16 of the container that has just been filled with fluid 26 is sealed closed by moving past heating element 34 of sealing device 32, thereby enclosing the fluid 26 held within such container. In this manner, a completed container 50 is formed, which may be manually detached from the rest of the film web 12 by tearing through the line of weakness (e.g., perforated seam) 52 as shown once the completed container has been conveyed beyond the sealing device 32. If desired, the film web 12 may be conveyed continuously, i.e., not in an indexed or intermittent fashion, with dispenser 24 ceasing dispensation of fluid 26 when the sides of the containers (i.e., transverse heat seals 60 and lines of weakness 52) pass beneath the dispenser.

If desired, the preceding method may be automated by including indicators 70 on film web 12, sensing device 72, and control device 76 as described above. Thus, automation of the process may be carried out by detecting, via sensing device 72, each of the indicators 70 on film web 12 and generating an output signal 74 upon detection of each indicator. Such output signal 74 is received from sensing device 72 by control device 76 as an input signal and, based at least in part on such input signal, the conveyance of film web 12 and dispensation of fluid 12 into each pre-formed container 14 is controlled by control device 76.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for dispensing fluid into pre-formed, flexible containers and enclosing the fluid within the containers, comprising:
   a. a web of film comprising a series of pre-formed flexible containers, each of said pre-formed containers being capable of holding therein a quantity of fluid and having an opening for receiving such fluid, said film web comprising a film having a pair of longitudinal side edges and a longitudinal fold to form a longitudinally-folded film web having two juxtaposed film plies with said side edges being positioned adjacent to one another, said folded film web comprising:
      (1) a closed longitudinal edge formed by said longitudinal fold;
      (2) an open longitudinal edge positioned opposite and substantially parallel to said closed longitudinal edge, said open longitudinal edge formed from said adjacently-positioned longitudinal side edges; and
      (3) a series of transverse heat seals extending from said closed longitudinal edge and bonding said juxtaposed film plies together such that said folded film web is segregated into said series of pre-formed flexible containers with said open longitudinal edge providing said openings into said containers for receiving fluid, wherein said transverse heat seals each have a first end and a second end, said first end located at said closed longitudinal edge and said second end terminating a predetermined distance from said open longitudinal edge;
   b. a mechanism that conveys said film web along a path of travel;
   c. a dispenser through which fluid may flow in predetermined amounts, said dispenser being positioned adjacent the travel path of said film web such that said dispenser is capable of dispensing fluid into said pre-formed containers via said openings therein, wherein
      (1) said dispenser has a discharge nozzle through which fluid exits said dispenser; and
      (2) said discharge nozzle is positioned within said folded film web between said open longitudinal edge and said second end of said transverse heat seals; and
   d. a device for sealing closed said opening in each of said pre-formed containers to partially enclose fluid held within said containers, said sealing device being adapted to form a longitudinal heat seal that bonds said juxtaposed film plies together and is positioned between said open longitudinal edge and said second end of said transverse heat seals, thereby forming a gap between said longitudinal heat seal and said second end of said transverse heat seals.

2. The apparatus of claim 1, wherein said pre-formed containers are manually detachable from said film web along one or more lines of weakness.

3. The apparatus of claim 2, wherein said lines of weakness comprise a series of perforations extending from one edge of said film web to an opposing edge thereof.

4. The apparatus of claim 1, wherein said pre-formed containers are manually detachable from said folded film web along one or more transverse lines of weakness.

5. The apparatus of claim 4, wherein said transverse lines of weakness extend from said closed longitudinal edge to said open longitudinal edge and are positioned between transverse heat seals from adjacent pre-formed containers.

6. The apparatus of claim 1, wherein
   a. said folded film web is conveyed in a substantially horizontal direction;
   b. said pre-formed containers are oriented in a substantially vertical configuration, with said open longitudinal edge of said folded film web forming an uppermost edge of each pre-formed container and said closed longitudinal edge of said folded film web forming a lowermost edge of each pre-formed container; and
   c. said dispenser is positioned to dispense fluid into said pre-formed containers in a substantially vertical, downward direction.

7. The apparatus of claim 1, further including
   a. one or more indicators on said film web;
   b. a sensing device capable of detecting said one or more indicators on said film web and generating an output signal upon detection of said one or more indicators; and
   c. a control device capable of receiving said output signal from said sensing device as an input signal and, based at least in part on said input signal, controlling the conveyance of said film web and dispensation of fluid into said pre-formed containers.

8. The apparatus of claim 7, wherein said sensing device is an optical sensing device and said indicators are optically-detectable.

9. The apparatus of claim 1, wherein said dispenser is adapted to dispense a fluid selected from polyols, isocyanates, and mixtures of polyols and isocyanates.

10. The apparatus of claim 1, wherein each of said pre-formed containers includes one or more individual channels in which fluid may be held.

11. The apparatus of claim 1, wherein said device for sealing closed said opening in each of said pre-formed containers comprises:
    a. an electrically conductive heating element having a first end secured to a first node and a second end secured to a second node; and
    b. a rotatable support cylinder having an outer, circumferential surface, said cylinder being positioned in abutting relationship with said heating element and capable of rotating against said heating element along a predetermined contact arc such that less than a complete circumference of said outer surface of said cylinder is in contact with said heating element, said contact arc being positioned in the travel path of said film web, whereby, said opening in each of said pre-formed containers is sealed closed when said conveying mechanism brings said film web into moving contact with said heating element along said contact arc and sufficient current is caused to flow through said heating element that said heating element heats to a sealing temperature that causes said opening to seal closed.

* * * * *